United States Patent [19]
Kersting et al.

[11] Patent Number: 6,051,523

[45] Date of Patent: Apr. 18, 2000

[54] CATALYST SYSTEMS OF THE TYPE COMPRISING THE ZIEGLER-NATTA CATALYSTS

[75] Inventors: Meinolf Kersting, Bad Dürkheim; Klaus-Dieter Hungenberg, Birkenau; Peter Kölle, Bad Dürkheim; Jürgen Kerth, Carlsberg, all of Germany

[73] Assignee: BASF Aktiengesellschaft, Ludwigshafen, Germany

[21] Appl. No.: 08/879,781

[22] Filed: Jun. 20, 1997

Related U.S. Application Data

[63] Continuation of application No. 08/576,401, Dec. 21, 1995, abandoned, which is a continuation of application No. 08/333,307, Nov. 1, 1994, abandoned.

[51] Int. Cl.[7] .................................................. B01J 31/00
[52] U.S. Cl. .......................... 502/107; 502/104; 502/116; 502/120; 502/125; 502/110; 502/127; 526/124.6; 526/125.3; 526/128
[58] Field of Search ...................... 502/104, 107, 502/116, 120, 125, 127, 110; 526/124.6, 125.3, 128

[56] References Cited

U.S. PATENT DOCUMENTS

| | | | |
|---|---|---|---|
| 4,159,963 | 7/1979 | Sakurai et al. | 526/128 |
| 4,226,741 | 10/1980 | Luciani et al. | 252/429 |
| 4,331,561 | 5/1982 | Luciani et al. | 252/429 |
| 4,533,705 | 8/1985 | Sato et al. | 526/114 |
| 4,732,882 | 3/1988 | Allen et al. | 502/104 |
| 4,761,461 | 8/1988 | Jaggard et al. | 526/125 |
| 5,081,088 | 1/1992 | Koelle et al. | 502/107 |
| 5,162,465 | 11/1992 | Kerth et al. | 526/128 |

FOREIGN PATENT DOCUMENTS

| | | |
|---|---|---|
| 427 080 | 6/1994 | European Pat. Off. . |
| 41 30 353 | 3/1993 | Germany . |

OTHER PUBLICATIONS

Synthesis of Poly[(acyloxy)aloxane] with Carboxyl Ligand and Its Utilization for the Processing of Alumina Fiber, Kimura et al., Macromolecules, vol. 20, No. 10, pp. 2329–2334, Oct. 1987.

*Primary Examiner*—David W. Wu
*Assistant Examiner*—Roberto Rabago
*Attorney, Agent, or Firm*—Keil & Weinkauf

[57] ABSTRACT

Catalyst systems of the type comprising the Ziegler-Natta catalysts contain, as active components,
a) a titanium-containing solid component which contains titanium, magnesium, halogen and a carboxylic ester as an electron donor, and, as a cocatalyst,
b) an aluminum compound and
c) if required, a further electron donor, a compound of the following formula I $$R_{m_1}Al\text{—}(OCOR^1)_{m_2} \qquad (I)$$

where
R and $R^1$ are identical or different and are each hydrogen or $C_1$–$C_8$-alkyl and
$m_1$ and $m_2$ are each 1 or 2 and sum to give 3, being used as aluminum compound b) in the preactivation of the titanium-containing soild compound a) with the cocatalyst.

7 Claims, No Drawings

CATALYST SYSTEMS OF THE TYPE COMPRISING THE ZIEGLER-NATTA CATALYSTS

This application is a continuation of application Ser. No. 08/576,401, filed on Dec. 21, 1995, now abandoned, which is a continuation of application Ser. No. 08/333,307, filed on Nov. 1, 1994, now abandoned.

The present invention relates to catalyst systems of the type comprising the Ziegler-Natta catalysts, containing, as active components, a) a titanium-containing solid component which contains titanium, magnesium, halogen and a carboxylic ester as an electron donor and, as a cocatalyst,
b) an aluminum compound and
c) if required, a further electron donor, a compound of the following formula I

$$R_{m_1}Al\text{—}(OCOR^1)_{m_2} \quad (I)$$

where
R and $R^1$ are identical or different and are each hydrogen or $C_1$–$C_8$-alkyl and
$m_1$ and $m_2$ are each 1 or 2 and sum to give 3, being used as aluminum compound b) in the preactivation of the titanium-containing solid component a) with the cocatalyst.

The present invention furthermore relates to a process for the preparation of such Ziegler-Natta catalyst systems, the preparation of polymers of propylene with the aid of these catalyst systems, the polymers obtainable thereby and films, fibers and moldings of these polymers.

Catalyst systems of the type comprising the Ziegler-Natta catalysts are disclosed in, inter alia, EP-B 014523, EP-A 023425, EP-A 045975 and EP-A 195497. These systems are used in particular for the polymerization of a-olefins and contain, inter alia, compounds of polyvalent titanium, aluminum halides and/or alkyl-aluminums, and electron donors, in particular silicon compounds, ethers, carboxylic esters, ketones and lactones which are used on the one hand in combination with the titanium component and on the other hand as a cocatalyst.

The Ziegler-Natta catalysts are usually prepared in two steps. First, the titanium-containing solid component is prepared. This is then reacted with the cocatalyst. The polymerization is then carried out with the aid of the catalysts thus obtained.

EP-A 427080 describes the preparation of Ziegler-Natta catalysts and the polymerization of propylene catalyzed therewith. These catalysts has good productivity and the polymerization catalyzed therewith haS good stereospecificity. However, the morphology of the polymer powder is not sufficiently homogeneous for many purposes. In particular, the fraction of very fine particles having a particle size of less than 0.25 mm should be reduced.

Furthermore, DE-A 41 30 353 discloses a process for the preparation of a Ziegler-Natta catalyst system, where the reaction mixture is deactivated by reaction with carbon dioxide after the reaction of the titanium-containing solid component with the cocatalyst. The resulting catalyst system has high productivity and gives propylene polymers having high stereospecificity and good morphology, ie. a small fraction of very fine particles. However, the reaction with carbon dioxide is in some cases relatively complicated in terms of process engineering since said reaction must be carried out between the activation of the catalyst system and the actual polymerization.

It is an object of the present invention to provide catalyst systems of the type comprising the Ziegler-Natta catalysts, which must be prepared with little expense but at the same time must have high productivity and must result in a highly stereospecific polymerization and a very small fraction of very fine particles in the polymer.

We have found that this object is achieved by the catalyst systems defined at the outset and of the type comprising the Ziegler-Natta catalysts.

In addition to a titanium-containing solid component a), the novel catalyst systems contain, inter alia, a cocatalyst. A suitable cocatalyst is the aluminum compound b). In addition to this aluminum compound, an electron donor c) is also preferably used as a further component of the cocatalyst.

On the one hand, the cocatalyst may be added to the titanium-containing solid component a) during the preactivation of the latter; on the other hand, it is also possible to mix further cocatalyst with the titanium-containing solid component a) after the preactivation and before or during the polymerization.

For the preparation of the titanium-containing solid component a), in general halides or alcoholates of trivalent or tetravalent titanium are used as the titanium compounds, the chlorides of titanium, in particular titanium tetrachloride, being preferred. Advantageously, the titanium-containing solid component contains a finely divided carrier, for which silicas and aluminas as well as aluminum silicates have proven useful. A particularly preferably used carrier is $SiO_2\cdot aAl_2O_3$, where a is from 0 to 2, in particular from 0 to 0.5.

Furthermore, compounds of magnesium are among the substances used in the preparation of the titanium-containing solid component. Particularly suitable compounds of this type are magnesium halides, alkylmagnesiums and arylmagnesiums, as well as alkoxy-magnesium and aryloxy-magnesium compounds, magnesium dichloride, magnesium dibromide and di-Cl-$C_{10}$-alkylmagnesium compounds being preferably used. The titanium-containing solid component may also contain halogen, preferably chlorine or bromine.

Furthermore, the titanium-containing solid component a) also contains electron donors, for example mono- or polyfunctional carboxylic acids, carboxylic anhydrides and carboxylates, as well as ketones, ethers, alcohols, lactones and organophosphorus and organosilicon compounds. Preferably used electron donors within the titanium-containing solid component are phthalic acid derivatives of the general formula III

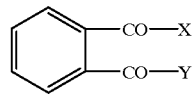

where X and Y are each chlorine or $C_1$–$C_{10}$-alkoxy or together form oxygen. Particularly preferred electron donors are phthalates where X and Y are each $C_1$–$C_8$-alkoxy, for example methoxy, ethoxy, propoxy or butoxy.

Further preferred electron donors within the titanium-containing solid component include diesters of 3- or 4-membered, unsubstituted or substituted cycloalkane-1,2-dicarboxylic acids of the general formulae IVa and IVb and monoesters of unsubstituted or substituted benzophenone-2-carboxylic acids of the general formula V

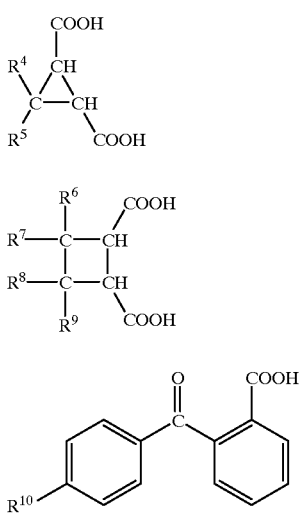

In the above formulae (IVa) and (IVb), $R^4$, $R^5$, $R^6$, $R^7$, $R^8$ and $R^9$ independently of one another may each be hydrogen, $C_1$–$C_{15}$-alkyl, $C_7$–$C_{15}$-alkylaryl or a 5-membered to 7-membered cycloalkyl group which in turn may carry $C_1$–$C_{10}$-alkyl groups, and in formula V $R^{10}$ may be hydrogen, $C_1$–$C_8$-alkyl or chlorine.

The hydroxy compounds used in the case of these esters are the alcohols usually employed in esterification reactions, including $C_1$–$C_{15}$-alkanols, $C_5$–$C_7$-cycloalkanols, which in turn may carry $C_1$–$C_{10}$-alkyl groups, and $C_6$–$C_{10}$-phenols.

The titanium-containing solid component may be prepared by conventional methods. Examples of these are described in, inter alia, EP-A 45 975, EP-A 45 977, EP-A 86 473, EP-A 171 200, GB-A 2 111 066 and U.S. Pat. No. 4,857,613.

In the preparation of the titanium-containing solid component a), the following two-stage process is preferably used:

In the first stage, a solution of the magnesium-containing compound in a liquid alkane is first added to a finely divided carrier, preferably $SiO_2 \cdot aAl_2O_3$, where a is from 0 to 2, in particular from 0 to 0.5, which as a rule has a particle diameter of from 0.1 to 1000 μm, in particular from 10 to 300 μm, a pore volume of from 0.1 to 10, in particular from 1.0 to 4.0, cm³/g and a specific surface area of from 10 to 1000, in particular from 100 to 500, m²/g, after which this mixture is stirred for from 0.5 to 5 hours at from 10 to 120° C. Preferably, from 0.1 to 1 mol of the magnesium compound is used per mole of the carrier. A halogen or a hydrogen halide, in particular chlorine or hydrogen chloride, is then added while continuously stirring in at least a two-fold, preferably in at least a five-fold molar excess, based on the magnesium-containing compound. After from about 30 to 120 minutes, a $C_1$–$C_8$-alkanol, in particular ethanol, a halide or an alcoholate of trivalent or tetravalent titanium, in particular titanium tetrachloride, and an electron donor are added to this reaction product at from 10 to 150° C. From 1 to 5 mol of the trivalent or tetravalent titanium and from 0.01 to 1, in particular from 0.1 to 0.5, mol of the electron donor are used per mole of magnesium of the solid obtained from the first stage. This mixture is stirred for at least one hour at from 10 to 150° C., and the resulting solid substance is then filtered off and washed with a $C_7$–$C_{10}$-alkylbenzene, preferably with ethylbenzene.

In the second stage, the solid obtained from the first stage is extracted for a few hours at from 100 to 150° C. with excess titanium tetrachloride or with an excess of a solution of titanium tetrachloride in an inert solvent, preferably an alkylbenzene, the solvent containing at least 5% by weight of titanium tetrachloride. The product is then washed with a liquid alkane until the wash liquid contains less than 2% by weight of titanium tetrachloride.

The titanium-containing solid component obtainable in this manner is used with a cocatalyst as the Ziegler-Natta catalyst system. A suitable cocatalyst is, inter alia, the aluminum compound b).

According to the invention, a compound of the following formula I $$R_{m_1}Al\text{—}(OCOR^1)_{m_2} \qquad (I)$$

where R and $R^1$ are identical or different and are each hydrogen or $C_1$–$C_8$-alkyl and $m_1$ and $m_2$ are each 1 or 2 and sum to give 3, is used as aluminum compound b) in the preactivation of the titanium-containing solid component a).

An aluminum compound b) of the formula I where R and $R^1$ are identical or different and are each $C_1$–$C_4$-alkyl, $m_1$ is 2 and $m_2$ is 1 is preferably used.

Among these aluminum compounds b), diethylaluminum propionate, diethylaluminum formate, dimethylaluminum propionate, diisobutyl-aluminum propionate, diethylaluminum acetate, dimethylaluminum acetate and the corresponding dialkylaluminum derivatives of butyric acid, especially the diethylaluminum derivative of butyric acid, are particularly preferred.

Such aluminum compounds are prepared, inter alia, by reacting the particular trialkyl compound with the corresponding carboxylic acid [inter alia according to Y. Kimura, S. Sugaya, T. Ichimura and I. Taniguchi, Macromolecules 20 (1987), 2329].

In addition to the aluminum compound b), electron donors c), for example mono- or polyfunctional carboxylic acids, carboxylic anhydrides and carboxylates, as well as ketones, ethers, alcohols, lactones and organophosphorus and organosilicon compounds, are also preferably used as a further cocatalyst. Preferred electron donors are organosilicon compounds of the general formula II $$R^2_n Si(OR^3)_{4-n} \qquad II$$

where the radicals $R^2$ are identical or different and are each $C_1$–$C_{20}$-alkyl, 5-membered to 7-membered cycloalkyl which in turn may carry a $C_1$–$C_{10}$-alkyl group, or $C_6$–$C_{20}$-aryl or arylalkyl, the radicals $R^3$ are identical or different and are each $C_1$–$C_{20}$-alkyl and n is 1, 2 or 3. Particularly preferred compounds are those in which $R^2$ is $C_1$–$C_8$-alkyl or a 5- to 7-membered cycloalkyl, $R^3$ is $C_1$–$C_4$-alkyl and n is 1 or 2.

Among these compounds, dimethoxydiisopropylsilane, dimethoxyisobutylisopropylsilane, dimethoxydiisobutylsilane, dimethoxydicyclopentylsilane, dimethoxyisobutylsec-butylsilane and diethoxyisobutylisopropylsilane are particularly noteworthy.

The individual compounds b) and, if required, c) may be used individually in any order or as a mixture of two components for the preactivation.

The novel catalyst systems are prepared by reacting the titanium-containing solid component a) with the cocatalyst, ie. the aluminum compound b) and, if required, the electron donor c), at from −20 to 60° C., in particular from 0 to 20° C., and from 0 to 60, in particular from 0 to 20, bar. The titanium-containing solid component a) is advantageously suspended in the cocatalyst or in a cocatalyst solution.

The reaction is advantageously carried out in the liquid phase. If the cocatalyst is present as a liquid at the reaction temperature, the reaction may be carried out in the presence or absence of a solvent. If the cocatalyst is present as a solid at the reaction temperature, it is advisable to use an inert solvent.

Suitable solvents are liquid hydrocarbons, preferably $C_5$–$C_{10}$-alkanes, particular preferably hexane or heptane, or mixtures of hydrocarbons.

Mixtures in which the molar ratio of the aluminum compound b) to be used according to the invention to titanium from the titanium-containing solid component a) is from 0.1:1 to 10:1, in particular from 1:1 to 5:1, and the molar ratio of aluminum compound b) to the further electron donor c) is from 0.1:1 to 200:1, in particular from 3:1 to 30:1, are preferably used.

The duration of the reaction is up to three hours, preferably up to 30 minutes.

The reaction of the titanium-containing solid component with the aluminum compound b) to be used according to the invention and of the formula (I) and, if required, the electron donor c) gives a preactivated catalyst system of the type comprising the Ziegler-Natta catalysts, which system can be isolated as a solid, has a long shelf life and does not have polymerization activity.

The novel catalyst systems can be further activated by reaction with further cocatalysts before or during use in a polymerization reaction. Suitable further cocatalysts are also aluminum compounds b).

Aluminum compounds b) which are suitable as further cocatalysts are trialkylaluminum as well as compounds in which an alkyl group is replaced by an alkoxy group or by a halogen atom, for example by chlorine or bromine. Trialkylaluminum compounds whose alkyl groups are each of 1 to 8 carbon atoms, for example trimethyl-, triethyl- or methyldiethylaluminum, are preferably used.

If necessary, the same electron donors c) as described above for the preactivation of the titanium-containing solid component a) may also be used as further cocatalysts.

In the further activation, the cocatalysts are preferably used in an amount such that the atomic ratio of aluminum from the aluminum compound to titanium from the titanium-containing solid component a) is from 10:1 to 800:1, in particular from 20:1 to 200:1, and the molar ratio of the aluminum compound to the electron donor c) used as cocatalyst is from 1:1 to 100:1, in particular from 2:1 to 80:1.

The novel catalyst systems are particularly suitable for the preparation of polymers of propylene, ie. homopolymers of propylene and copolymers of propylene together with other α-olefins.

The preparation of polyolefins, in particular of polymers of propylene, can be carried out in the conventional reactors used for the polymerization of propylene, either batchwise or, preferably, continuously, inter alia as suspension polymerization or, preferably, as gas-phase polymerization. Suitable reactors include continuously operated stirred reactors which contain a fixed bed of finely divided polymer which is usually kept in motion by suitable stirring apparatuses. The reaction can of course also be carried out in a plurality of reactors connected in series. The reaction time depends decisively on the particular reaction conditions chosen. It is usually from 0.2 to 20, in general from 0.5 to 10, hours.

In addition to the homopolymers of propylene, copolymers or terpolymers of propylene with other α,β-unsaturated olefinic compounds of 2 to 8 carbon atoms may also be prepared, for example with α-monoolefins or with bifunctional α-olefins, such as hexa-1,5-diene. Particularly suitable comonomers are ethylene, but-1-ene, pent-1-ene, hex-1-ene and oct-1-ene. Comonomers which are particularly suitable for the terpolymerization are ethylene and but-1-ene.

The copolymers obtained may have a block, random or alternating structure. The novel catalyst system is also particularly suitable for the preparation of propylene/ ethylene copolymers containing up to 10% by weight of polymerized ethylene and of terpolymers of propylene with minor amounts of polymerized ethylene and but-1-ene.

The polymerization reaction is advantageously carried out at from 20 to 150 ° C., preferably from 40 to 100 ° C., and from 1 to 100, preferably from 10 to 50, bar. The molecular weight of the polyolefins formed can be regulated and adjusted over a wide range by adding regulators conventionally used in polymerization technology, for example hydrogen. It is also possible concomitantly to use inert solvents, for example toluene or hexane, inert gas, such as nitrogen or argon, and relatively small amounts of polypropylene powder.

The novel propylene homopolymers and copolymers are obtainable with the molecular weights usual for the polyolefins, polymers having molecular weights of from 20 000 to 500 000 being preferred. Their melt flow indices at 230° C. and under a weight of 2.16 kg, according to DIN 53 735, are from 0.1 to 100, in particular from 0.5 to 50, g/10 min.

Compared with the conventional catalyst systems, the novel catalyst system has higher productivity and improved stereospecificity, in particular in gas-phase polymerizations. The polymers obtainable in this manner possess in particular a very small fraction of very fine particles having a particle size of less than 0.25 mm and a low residual chlorine content. Another advantage of the novel catalyst system is that the preactivation step of the titanium-containing solid component a) is not very complicated in terms of process engineering.

Owing to their good mechanical properties, the propylene polymers prepared using the novel catalyst system are particularly suitable for the production of films, fibers and moldings.

EXAMPLES

Example 1 a) Preparation of the titanium-containing solid component (1)

In a first stage, a solution of n-butyloctylmagnesium in n-heptane was added to $SiO_2$ which had a particle diameter of from 20 to 45 μm, a pore volume of 1.7 ml/g and a specific surface area of 330 $m^2$/g, 0.3 mol of the magnesium compound being used per mole of $SiO_2$. The solution was stirred for 45 minutes at 40° C. and then cooled to 20° C., after which 10 times the molar amount, based on the organomagnesium compound, of hydrogen chloride was passed in. After 60 minutes, 3 mol of ethanol per mole of magnesium were added to the reaction product with constant stirring. This mixture was stirred for 0.5 hour at 80° C. and then 7.2 mol of titanium tetrachloride and 0.3 mol of diisobutyl phthalate dissolved in ethylbenzene were added, the amounts in each case being based on 1 mol of magnesium. Thereafter, stirring was carried out for 1 hour at 100° C. and the solid substance thus obtained was filtered off and washed several times with ethylbenzene.

The solid product obtained therefrom was extracted for 3 hours at 125° C. with a 10% strength by volume solution of titanium tetrachloride in ethylbenzene. The solid product was then separated from the extracting medium by filtration and was washed with n-heptane until the extracting medium contained only 0.3% by weight of titanium tetrachloride.

The titanium-containing solid component contained 3.8% by weight of Ti 6.2% by weight of Mg and 25.8% by weight of Cl.

b) Preactivation of the titanium-containing solid component 700 ml of n-heptane were initially taken in a 1 l glass autoclave provided with a stirrer, and the reaction vessel was cooled to an internal temperature of 5° C. 47.4 mmol of diethylaluminum propionate (in the form of a 1.0 molar solution in n-heptane) and 1.3 ml of dimethoxyisobutyliso-propylsilane (in the form of a 1.0 molar solution in n-heptane) were added to the solvent. 20 g of the titanium-containing solid component prepared according to Example 1a were then added. 23.6 g of a solid were obtained.

c) Polymerization of propylene

The polymerization was carried out in a vertically stirred gas-phase reactor having a useful volume of 800 l in the presence of hydrogen as a molecular weight regulator. The reactor contained an agitated fixed bed of finely divided polymer. The polymer output of the reactor was 85 kg of polypropylene per hour in all examples.

Gaseous propylene was passed into the gas-phase reactor at 32 bar and 80° C. In an average residence time of 2.5 hours, polymerization was carried out continuously with the aid of the catalyst system described in Example 1 b, 4.3 g of the catalyst system described in Example 1 b, 250 mmol of triethylaluminum and 25 mmol of dimethoxyisobutylisopropylsilane as cocatalyst being used per hour.

After the end of the gas-phase polymerization, a propylene homopolymer having a melt flow index of 14.6 g/10 min at 230° C. and 2.16 kg (according to DIN 53735) was obtained.

Example 2

In contrast to Example 1, only 7.9 mmol of diethylaluminum propionate were used under otherwise identical conditions in the preactivation 1b). After the end of the gas-phase polymerization of propylene 1c, a propylene homopolymer having a melt flow index of 15.1 g/10 min at 230° C. and 2.16 kg (according to DIN 53735) was obtained.

Comparative Example A

Example 1 was repeated under otherwise identical conditions, except that the preactivation of the titanium-containing solid component a) with diethylaluminum propionate was dispensed with.

The table below shows the results of novel Examples 1 and 2 and of Comparative Example A with regard to the productivity (g of polymer/g of titanium-containing solid component), the xylene-soluble fraction (measure of the stereospecificity), the very fine particle fraction (<0.25 mm) and the chlorine content of the resulting propylene homopolymers.

TABLE

| | Example 1 | Example 2 | Comp. Example A |
|---|---|---|---|
| Productivity [g of polymer/g of titanium-containing solid component] | 28670 | 25800 | 19500 |
| Xylene-soluble fraction* [%] | 1.4 | 1.3 | 1.6 |
| Fine particle fraction [<0.25 mm]** [%] | 0.2 | 0.9 | 2.6 |
| Chlorine content*** [ppm] | 9 | 10 | 13 |

The table shows that the novel catalyst systems lead to polymers having a higher stereospecificity, a smaller very fine particle fraction and a reduced chlorine content. Moreover, the novel catalyst systems have higher productivity.

We claim:

1. A process for the preparation of a Ziegler-Natta catalyst system which comprises forming a preactivated solid component of a Ziegler-Natta catalyst system, said component by itself having no polymerization activity, which component is prepared by a process which comprises reacting at from −20 to +60° C. and at from 0 to 60 bar (a) a titanium-containing solid component which contains titanium, magnesium, halogen, and a carboxylic ester as an electron donor, with (b) an aluminum compound of the formula (I)

$$R_{m_1}Al-(OCO-R^1)_{m_2} \quad (I)$$

where R and $R^1$ are identical or different and are each H or $C_1$–$C_8$-alkyl and $m_1$ and $m_2$ are each 1 or 2 and sum to give 3, and thereafter further activating the preactivated solid component by reaction with a cocatalyst selected from the group consisting of trialkyl aluminum compounds and trialkyl aluminum compounds in which an alkyl group is replaced by an alkoxy group or a halogen atom.

2. A process as defined in claim 1, wherein the preactivated component is further activated with an additional electron donor in addition to the cocatalyst selected from the group consisting of trialkyl aluminum compounds and trialkyl aluminum compounds in which an alkyl group is replaced by an alkoxy group or a halogen atom.

3. A process as defined in claim 2, wherein the additional electron donor is an organosilicon compound of the formula II $$R^2_n Si(OR^3)_{4-n} \quad (II)$$

where the radicals $R^2$ are identical or different and are each $C_1$–$C_{20}$-alkyl, 5-membered to 7-membered cycloalkyl which in turn may carry a $C_1$–$C_{10}$-alkyl group, or $C_6$–$C_{20}$-aryl or arylalkyl, the radicals $R^3$ are identical or different and are each $C_1$–$C_{20}$-alkyl and n is 1, 2 or 3.

4. A process as defined in claim 1, where, in the formula (I) of the aluminum compound b), R and $R^1$ are identical or different and are each $C_1$–$C_4$-alkyl, $m_1$ is 2 and $m_2$ is 1.

5. A process as defined in claim 1, wherein the aluminum compound b) is diethylaluminum propionate.

6. A process as defined in claim 1, wherein the titanium-containing solid component a) comprises $SiO_2 \cdot aAl_2O_3$ as a carrier, where a is from 0 to 2, in which the carrier is part of the catalyst system.

7. A process as defined in claim 2, wherein the additional electron donor is selected from the group consisting of mono- and polyfunctional carboxylic acids, carboxylic anhydrides and carboxylates, ketones, ethers, alcohols, lactones, organophosphorous and organosilicon compounds.

* * * * *

UNITED STATES PATENT AND TRADEMARK OFFICE
CERTIFICATE OF CORRECTION

PATENT NO.: 6,051,523

DATED: April 18, 2000

INVENTOR(S): KERSTING et al.

It is certified that error appears in the above-identified patent and that said Letters Patent is hereby corrected as shown below:

On the cover page, insert the following priority data:

--[30] Foreign Application Priority Data

Nov. 25, 1993 [DE] Germany .................... P 43 40 140.6--.

Signed and Sealed this

Twenty-seventh Day of March, 2001

Attest:

NICHOLAS P. GODICI

*Attesting Officer*   *Acting Director of the United States Patent and Trademark Office*